US008206224B2

(12) United States Patent
Farone et al.

(10) Patent No.: US 8,206,224 B2
(45) Date of Patent: Jun. 26, 2012

(54) USER CREATED CONTENT AND QUESTS

(75) Inventors: Mike Farone, Austin, TX (US); Travis Hicks, Cedar Park, TX (US); Jesse Benjamin, Round Rock, TX (US); Chris Cao, Austin, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 395 days.

(21) Appl. No.: 12/471,308

(22) Filed: May 22, 2009

(65) Prior Publication Data
US 2009/0305774 A1     Dec. 10, 2009

Related U.S. Application Data

(60) Provisional application No. 61/055,375, filed on May 22, 2008.

(51) Int. Cl.
*A63F 9/24*     (2006.01)
(52) U.S. Cl. .................... 463/43; 463/9; 463/23; 463/42
(58) Field of Classification Search ................ 463/9, 23, 463/42, 43
See application file for complete search history.

(56) References Cited

U.S. PATENT DOCUMENTS

| | | | | |
|---|---|---|---|---|
| 7,840,570 | B2 * | 11/2010 | Cervera et al. ................. | 707/748 |
| 2002/0178223 | A1 * | 11/2002 | Bushkin ......................... | 709/205 |
| 2010/0058207 | A1 * | 3/2010 | Hamey et al. .................. | 715/763 |

OTHER PUBLICATIONS

Ullmann, "MMORPG Construction Kit (TM) v1.1 Patch," Jul. 26, 2001, FilePlanet, accessed on Mar. 26, 2009 at http:www.fileplanet.com/63286/60000/fileinfo/MMORPG-Construction-Kit%E2%84%A2—v1.1-Patch, 2 pages.
Online Massively Multiplayer, "Create Your Own MMORPG Virtual World With Free Metaplace MMO Platform from Raph Koster—Open Beta Soon," 2009, Online Massively Multiplayer, accessed on Mar. 26, 2009 at http://www.onlinemassivelymultiplayer.com/upcoming-mmorpgs/create-your-own-mmorpg-virtual-world-with-free-metaplace-mmo-platform-from-raph-koster-open-beta-soon, 6 pages.
Ullmann, "MMORPG Construction Kit Interview," Jul. 26, 2001, RPG Vault, accessed on Mar. 26, 2009 at http://rpgvaultarchive.ign.com/features/interviews/mmorpgkit.shtml, 5 pages.
Ullmann, "MMORPG Construction Kit (TM) v1.1 Patch," Jul. 26, 2001, FilePlanet, accessed on Mar. 26, 2009 at http:www.fileplanet.com/63286/60000/fileinfo/MMORPG-Construction-Kit%E2%84%A2--v1.1-Patch, 2 pages.
Create or Conquer, "Create Your Own RPG Game World!" original date unknown, Create or Conquer, accessed on Mar. 26, 2009 at http:www.createorconquer.com/create-your-own-rpg-game.php, 2 pages.

(Continued)

*Primary Examiner* — Fernando L Toledo
(74) *Attorney, Agent, or Firm* — Samuel S. Lee; Procopio, Cory, Hargreaves & Savitch LLP

(57) ABSTRACT

A computer-implemented method of providing an environment for a crafting player to craft a role-playing content and/or quests in a computer game, the method including: obtaining tokens that represent in-game assets; placing the tokens to craft the role-playing content and/or quests; inviting other players to participate in the role-playing content and/or quests; running the role-playing content and/or quests; receiving at least one reward based on the rating entered by the other players; and saving a layout and composition of the crafted role-playing content and/or quests in a blueprint. Keywords include MMO, role-playing event, quests, and souvenirs.

23 Claims, 9 Drawing Sheets

OTHER PUBLICATIONS

James, "The First MMORPG to Offer User Content!" Mar. 2, 2009, Limey Dragon Games & Hobbies, accessed on Mar. 26, 2009 at http://www.limeydragon.com/article.php/20090302122454421, 3 pages.

Golemizer Forums, "Building Quests," Oct. 28, 2008, Golemizer Forums, accessed on Mar. 26, 2009 at http://forums.golemizer.com/viewtopic.php?f=14&t=679, 13 pages.

Fishon, "Who Else Wants to Make Online Games With ZERO Programming?" 2009, MMORPG Maker, accessed on Mar. 26, 2009 at http:www.mmorpg-maker.com/, 11 pages.

Sailor, "My 2 Cents: Holic," Jan. 12, 2009, Mabinogi Guru Forums, accessed on Mar. 26, 2009 at http:www.mabiguru.com/forums/entertainment/9833-my-2-cents-holic.html, 6 pages.

Nowhere Else and Beyond, "Nowhere else and beyond—A free 2D MMORPG," original date unknown, Nowhere Else and Beyond, accessed on Mar. 26, 2009 at http://www.nowhere-else.org/rpg/index.php? Action=Screenshots, 5 pages.

Online Massively Multiplayer, "Create Your Own MMORPG Virtual World With Free Metaplace MMO Platform from Raph Koster—Open Beta Soon," 2009, Online Massively Multiplayer, accessed on Mar. 26, 2009 at http://www.onlinemassivelymultiplayer.com/upcoming-mmorpgs/create-your-own-mmorpg-virtual-world-with-free-mtaplace-mmo-platform-from-raph-koster-open-beta-soon, 6 pages.

Phillip, "Create Your Own Online Role Playing Game," Mar. 1, 2007, Associated Content, accessed on Mar. 26, 2009 at http://www.associatedcontent.com/article/157527/create_your_own_online_role_playing.html, 3 pages.

* cited by examiner

300

QUEST BUILDER

RECIPES:

| Title | Status |
|---|---|
| Anakin's Journey | OK |
| Return to Jabba's Palace | Edited |
| The Arcturan Gambit | Missing |

[New] [Delete] [Save]

TASKS: ☒ Show Missing

| Title | Tags |
|---|---|
| Kill 5 Kreetles | MP |
| Kill 10 Kreetles | |
| Kill the Kreetle King | CW |

[Add Task] [Open Souvenir Book]

RETURN TO JABBA'S PALACE

Help out a farmer friend.

TASKS:

TASK 1: KILL 10 KREETLES

Kreetles are destroying my farm! Can you help me?

TASK 2: GO TO THEED PALACE

Why won't the Emperor do anything about the problems we farmers are having? Here, I've written a protest letter. Can you deliver it to the palace at Theed?

TASK 3: GO TO KASHYYYK LOCATION
LOCATION: X [CREDITS] Y: [CREDITS]

Beauracrats. Well, if need we need a lawyer, I know a firm that has some ... connections. Take it to this address.

TASK 4: GIVE ITEM TO NPC

They wouldn't take it either, huh? Well, I know a reporter over in Moenia that can help us out. Here, give her this.

QUEST INFO:

Level 17
Quest XP 1050
Story XP 2148
Tasks 5/8
Characters Used 1024/2250

Requires
 Crafting Kashyyyk Combat

REWARDS:

Drag items here to provide rewards for this quest.

CREDITS: [0]

CREATE QUEST

FIG. 3

USER CREATED CONTENT AND QUESTS

CROSS-REFERENCE TO RELATED APPLICATIONS

This application claims the benefit of priority of U.S. Provisional Patent Application No. 61/055,375, filed May 22, 2008, entitled "User Created Content and Quests." The disclosure of the above-referenced provisional application is incorporated herein by reference.

BACKGROUND

A massively multiplayer online (MMO) role-playing game is an online computer game in which a large number of players interact with one another in a virtual world. As in most role-playing games, players assume the role of a fictional character ("player character") and take control over most of that character's actions. MMO games are distinguished from single-player or small multi-player games by the game's persistent world, usually hosted by a game provider, which continues to exist and evolve even when the player is away from the game.

The player character typically spends most of its time improving itself through the collection of experience points, which are earned, for example, through killing monsters and completing adventures assigned to the player character by server-controlled non-player characters or creatures scattered throughout the virtual world in strategic locations. Non-player characters are server-controlled characters who primarily exist in order to provide information, supplies, and rewards for the player characters.

SUMMARY

Implementations of the present invention allow players of a massively multiplayer online game (MMO) with licensed content to create role-playing content and/or quests.

In one implementation, a method of providing an environment for a crafting player to craft a role-playing content and/or quests in a computer game is disclosed. The method including: obtaining tokens that represent in-game assets; placing the tokens to craft the role-playing content and/or quests; inviting other players to participate in the role-playing content and/or quests; running the role-playing content and/or quests; receiving at least one reward based on a rating entered by the other players; and saving a layout and composition of the crafted role-playing content and/or quests in a blueprint.

In another implementation, a computer-readable storage medium storing a computer program for crafting a role-playing content and/or quests is disclosed. The program including executable instructions that cause a computer to: obtain tokens that represent in-game assets; place the tokens to craft the role-playing content and/or quests; invite other players to participate in the role-playing content and/or quests; run the role-playing content and/or quests; receive at least one reward based on the rating entered by the other players; and save a layout and composition of the crafted role-playing content and/or quests in a blueprint.

In yet another implementation, a method of crafting quests in a computer game is disclosed. The method including: displaying a list of souvenir task tokens, each souvenir task token used to define a task; loading a number of task tokens selected from the list into a blank quest; providing text blocks to allow a crafting player to input a flavor text for the task defined for each souvenir task token; granting experience points to the crafting player based on tasks that are put into the quest; and saving a layout and composition of the crafted role-playing content and/or quests in a blueprint.

BRIEF DESCRIPTION OF THE DRAWINGS

FIG. 3 is a quest builder UI in accordance with one implementation of the present invention.

DETAILED DESCRIPTION

Figure 1:
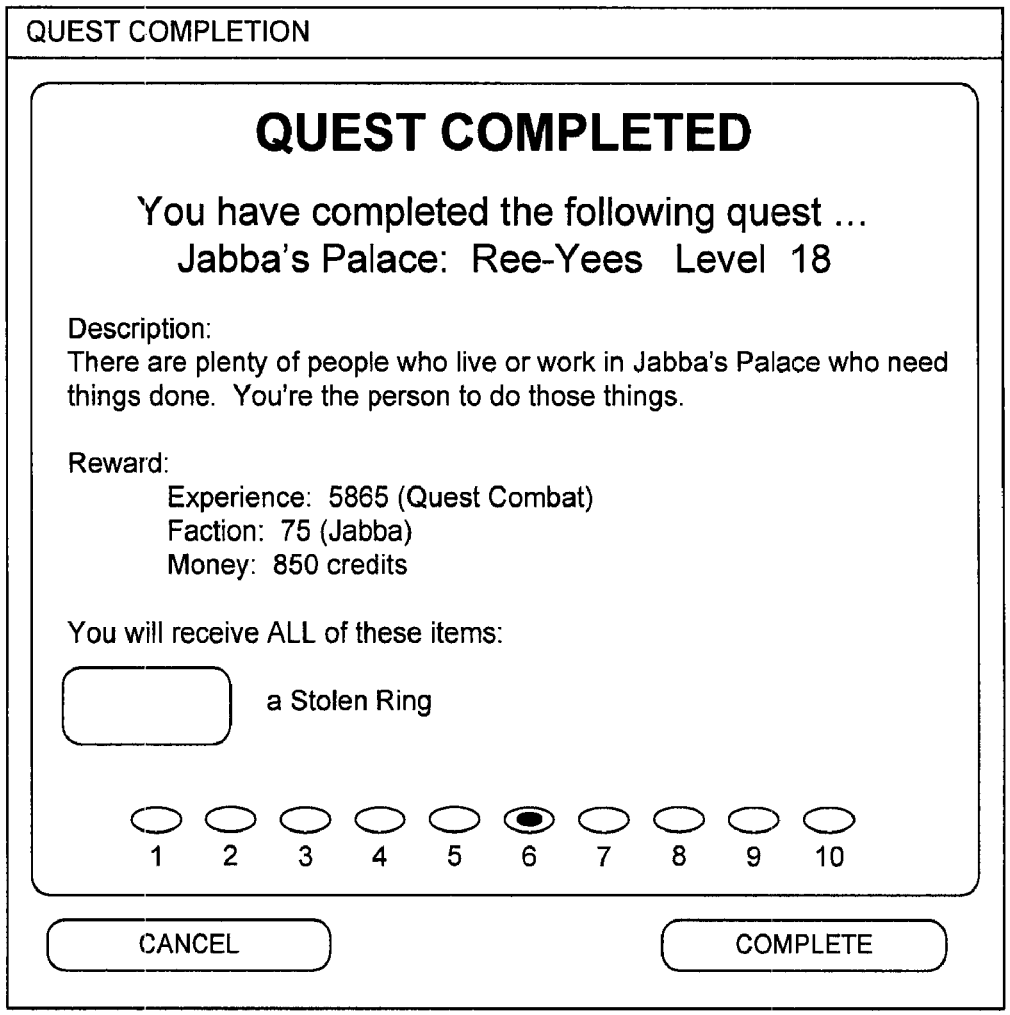
FIG. 1 is a quest rating window with radial buttons which appears when a player completes a quest crafted by a storyteller.

Implementations of the present invention allow players of a massively multiplayer online game (MMO) with licensed content to create role-playing content and/or quests.

In an implementation for creating role-playing content, players are able to purchase tokens that represent in-game assets such as creatures, buildings, weapons, effects and sounds. The players can then place these assets in the shared world and create a role-playing event ("storytelling") that allows other players to participate by invitation. Storytelling players ("storytellers") can also save the layout and composition of these creations to a blueprint which can be traded with other players.

In one implementation, blueprints allow a storyteller to lay out a scene with storyteller props, save that scene, and deploy it quickly and easily. Thus, a blueprint can be used to save the scene and re-use the same scene at a later time, or to trade or give to other players.

In one implementation, props, effects, and non-player character within 100 meters are saved to a blueprint, which should have limits such as a limit of 200 storyteller items that can be saved in each blueprint. In this implementation, only storyteller objects that belong to the player will be saved to the blueprint. Further, some unique storyteller objects may not be saved in a blueprint, such as storyteller vendors, race coordinator droids, and jukeboxes.

Once the storyteller scene has been saved, the saved blueprint can be used to stage the same scene over and over again. The props, NPCs, and effects can be placed as were originally set in the scene. All of the required storyteller tokens should be loaded into the blueprint in order to deploy the scene. The number of tokens necessary to lay out the story can be reviewed in a storyteller blueprint window. To re-tell the story, the blueprint is loaded with tokens, and the blueprint is deployed. Once deployed, the ground targeting indicator is used to place the scene. The storyteller tokens will be consumed as the props, NPCs, and effects are placed as they were saved. Each object that is placed by the blueprint should comply with normal storyteller rules for placement. If one object is in a disallowed location, then the entire blueprint fails to deploy.

The blueprint options allow the player to save a completely new scene to the blueprint, or copy the saved blueprint to another blank blueprint in the inventory. In one case, only the designer or initial creator of a blueprint can make copies of the blueprint. In this case, anyone who obtains a blueprint from someone else will not be able to copy the blueprint. Further, if a storyteller deploys a blueprint that the storyteller did not design, the objects created will be the storyteller's responsibility. However, the storyteller will not be able to save the blueprint into a new blueprint since the story was laid out in a design created by someone else. In another case, if a new scene is re-saved onto a blueprint that already had tokens loaded into it, those old tokens will be lost when the new scene overwrites the old scene.

In another implementation, storytellers are allowed to create their own custom instances. For example, a storyteller reserves a dungeon, and places the non-player characters to fight inside the dungeon. Later, the storyteller can sell the crafted quest to another player who is directed to that instance (i.e., placed in the dungeon) and is made to fight its way through the dungeon. Thus, the custom instances are similar to the blueprints, but expand the concept of storing the layout of object placement to allow the storytellers to decorate and populate a place (e.g., a dungeon). Then, the place would only spawn the objects and creatures when another player who is flagged for the instances comes along and enters it.

In an implementation for creating quests, players are able to build their own unique quests using a token-based system. The MMO world is populated with thousands of trigger tokens that players can collect as treasures or earn as rewards. An in-game user interface (UI) allows players to assemble these tokens into a set of steps and attach an item, cash or experience as a reward. The players can also enter free-form text to fictionalize the quest. An object is then created which holds the quest. This can be copied to or traded with other players.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, a storyteller can be anyone including a player that runs events for a player association, city, or server to entertain other players. A role player is one example of a storyteller. The storyteller can create an event or story by making a video and/or comic using the game engine. Further, the storyteller can build points of interest and locations, and even populate them with attackable non-player characters (NPCs). There are many reasons to have an event or to try to tell a story. In one example, a city sets up an event to attract new citizens.

Storytellers progress by skill tiers rather than by levels. Thus, storytellers gain experience by having other players complete crafted quests and consuming souvenir tokens placed in the MMO world by the storytellers. Thus, the players can start as novice storytellers or can learn to be novice storytellers. Experience gained from other players completing the storytellers' quests is calculated based on the complexity of the quest. In one example, the first three tiers after the novice tier can be achieved by crafting quests. After those skill tiers have been achieved, the players gain experience by running their quests and consuming souvenir tokens.

In one implementation, the players are considered as novice storytellers when they first log into the game. In one case, the players are given two rare consumable souvenirs when they first log in. Further, novice storytellers start with starter kits, where each starter kit has a certain number of specific task types. A starter kit can include, for example, two destroy multiple tasks, one craft-item task, one give-item-to-NPC task, four go-to-location tasks, and one perform task. In one specific implementation, storyteller vendors are vendors used only for selling quest holocrons, which are devices (usually cube-shaped) that serve as a repository of knowledge. As the player progresses, the player can create newly appearing vendors such as Jawas. Table 1 and Table 2 below show the breakdown of the potential rewards for skill tiers including quests allowed, tasks allowed, commands granted, and items granted.

Once the quests have been crafted, experience is calculated with a formula that takes into account the complexity of the quest (defined by the tasks) and the rating received by the player after the quest is completed. The storyteller will not receive experience point(s) (XP) for the quest until someone completes the quest. However, this rule does not apply to a storyteller who is still a novice, and has not achieved the first tier. Thus, if the storyteller is a novice, the storyteller receives XP just for crafting the role-playing content.

FIG. 1 is a quest rating window 100 with radial buttons 102 which appears when a player completes a quest crafted by a storyteller. Thus, this window 100 allows the player to rate the quality of the quest. The rating is then used as a modifier on the XP granted to the storyteller. The modifier is a formula that will add a percentage to the XP reward based on the rating.

Figure 2:
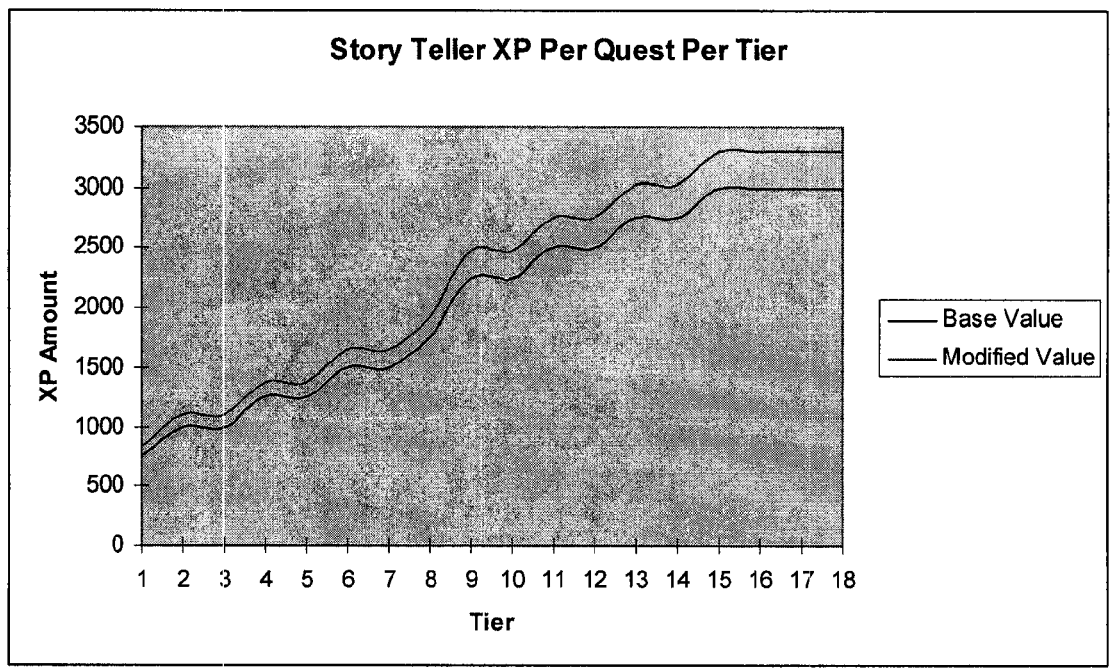
FIG. 2 shows a graphical representation of how much XP, per quest, a storyteller will receive in accordance with one implementation of the present invention.

FIG. 2 shows a graphical representation 200 of how much XP, per quest, a storyteller will receive in accordance with one implementation of the present invention. The graphical representation 200 is based on a number of tasks allowed in a quest. For example, at Tier 15, the player is able to make quests with a maximum number of tasks (i.e., 12). Thus, this chart makes an assumption that the most XP given by any task is 250. The purpose of the chart 200 is to show the flow of XP per tier.

A player can retrieve souvenirs in several different ways. In one case, souvenirs can be retrieved by visiting a specific location which involves 'Go To' tasks for the area in which the tasks are found. For example, as the player comes upon Lars' home on Tatooine, the player receives the Lars Homestead Souvenir. Used in a quest, this souvenir would point the player to that area. A variation could include visiting cantinas, theaters, Theed Palace and similar areas. These tasks would grant the player 'Perform' souvenirs. Other variations include dungeons, faction installations, and other related places where the player could get 'Retrieve Item' souvenirs for these areas.

In another case, souvenirs can be retrieved by finding random loot drops used for 'Destroy Multiple and Loot' and 'Destroy Multiple'. Further, if a player is killing faction non-player characters (NPCs) such as Stormtroopers, then this can be used for 'PvP Kill Player' and 'PvP Objective' tasks. For example, the player is killing Nightsisters on Dathomir and receives the 'Kill 10 Nightsisters' souvenir.

In another case, souvenirs can be retrieved by crafting items such that whenever a player handcrafts an item, the player has a small chance of receiving a random 'Craft Item' souvenir. A player can receive more of these souvenirs by visiting areas like Wattos shop and similar places.

In yet another example case, souvenirs can be retrieved by defeating named enemies such as dungeon bosses like Axkva Min and NK Necrosis. By defeating named enemies, a player not only receives a 'Destroy Multiple' souvenir for that boss but also receives some of the more rare souvenirs like 'Timer'.

In yet another case, souvenirs can be retrieved by talking to celebrity NPCs like Darth Vader and Han Solo. Thus, a player can receive 'Give Item to NPC' souvenirs and fitting 'Comm.' Souvenirs, for example, by talking to the celebrity NPCs. For example, a stormtrooper talking to Darth Vader would receive a Comm. souvenir.

In one implementation, a player gets a system message explaining what was received and why it was earned, when the player receives a souvenir. In this implementation, the souvenir is placed directly into the player's inventory. Further, the player gets a 'script var' for that particular task ID which will block the player from receiving another one for at least one hour. An exception to this rule includes a situation where souvenirs are dropped as loot. In this case, the souvenirs are gated only by the loot drop rate.

A souvenir is an actual item in the player's inventory. Thus, by using the radial menu on this item, the player can add the souvenir to the souvenir book. This allows the player to use the task associated with it in the player's quests. Alternatively, the player can trade or sell them to other storytellers. The player can also trade the extra souvenirs for items that the player can either use as rewards in the quests or keep the extra souvenirs. Another way to use the souvenirs is to trade in a number of certain types of souvenirs to get an upgraded version of the souvenirs. For example, the player can turn in ten 'Destroy Multiple 10 Nightsisters' and get 'Destroy Multiple 1 Axkva Min'. Turn-ins for reward items or upgraded souvenirs are only available for souvenirs that have a random element to them (e.g., loot drops) or that require the player to go to a dangerous area (e.g., a retrieve item souvenir in the Death Watch bunker).

In another implementation, each souvenir (or the task associated with it) has different statistics on it. For example, a 'Go To' task has the coordinate statistics, and a 'Destroy Multiple' task has the statistics for the number and type of enemies a player has to defeat. Further, all tasks have the following statistics. For example, storyteller experience is used to determine how much experience the storyteller will receive when a player finishes his/her quest. The quest yields more experience for the storyteller when there are more tasks and the tasks are more complex. In another example, level is used to determine the level of a storyteller's quest (once the quest is finished). The level of the entire quest viewed by another player is determined by the task with the highest level. For example, souvenirs with high level would be 'Go To' tasks on Dathomir, Kill Multiple quests in the Geonosian bunker, and so on. Most 'Craft Item' and 'Performance' would have a level of one. An exception includes, for example, crafting an item that has to use the stations in the Death Watch bunker.

In yet another example, each souvenir has an experience value (exp) assigned to it. Once a souvenir is used in a quest, total exp from all the tasks in that quest will be exp gained by the player finishing the quest.

As mentioned above, a player is granted a novice storyteller skill upon purchase of the game, and is given a starter pack of tokens. With these items, the player can immediately start crafting quests. In one implementation for crafting quests, a user interface for crafting quests (a quest builder UI) is needed to meet several goals. For example, the Quest builder and the Recipe book share the same UI element. The UI also needs to be able to accommodate all souvenirs (since all souvenirs will be displayed) with differentiation between souvenirs already owned and souvenirs that still need to be acquired. In this implementation, the UI needs a way to show that a quest cannot be instantiated when there are missing souvenirs, and should have tags for each task which depict what special requirements are needed. The UI further needs an easy-to-read story XP readout, a read out depicting how many characters are left to use, and a read out for a quest level.

FIG. 3 is a quest builder UI 300 in accordance with one implementation of the present invention. In the illustrated implementation of FIG. 3, a list of souvenir task tokens is displayed when a player opens the quest builder UI 300. The player can then load these tokens into a blank quest, either by double-clicking or dragging-and-dropping the tokens. In one implementation, all souvenir/quest tokens are permanent, and there are no limited-use tokens. To view a basic description of each task type, a player places the cursor over the task, and a tool-tip provides the description. The quest builder UI 300 also includes text blocks which are provided to allow the player to input a flavor text for each task.

In the illustrated implementation of FIG. 3, when a storyteller is done crafting the quest, the quest grants the storyteller XP based on the tasks that are put into the story. Furthermore, the quest can be stored in the player's recipe book. The recipe listing is a pane used to hold all the crafted quests that a player has made, up to a certain maximum. However, recipes do not contain reward information, other than credits which can be checked for credits on-hand when quest is instantiated. When one recipe is clicked, the quest builder UI 300 is displayed adjacent to it so that the storyteller can look at the tasks that were used in the quest. When a "create quest" button (which is shown at the bottom of the recipe listing pane) is clicked, the system attempts to make a quest holocron. Since a player needs an empty quest holocron in order to create a quest, the holocrons can be acquired from vendors in a game. The holocrons can be shaded in different colors based on the quest difficulty.

The illustrated implementation of FIG. 3 also shows slots in the rewards section into which rewards can be dragged and dropped. Some rewards are tokens received by the players in a game that will allow for choice rewards. The players get a choice of whatever items are in that token. Thus, the system needs to remember stacks of items. For example, if a stack or crate is dragged over as a reward, the system prompts the player for the intended amount. Further, when the quest is instantiated, the system attempts to fill the slot that previously had a stack. If the stack no longer exists in the player's inventory, there should be a visual indication of this.

Figure 4:
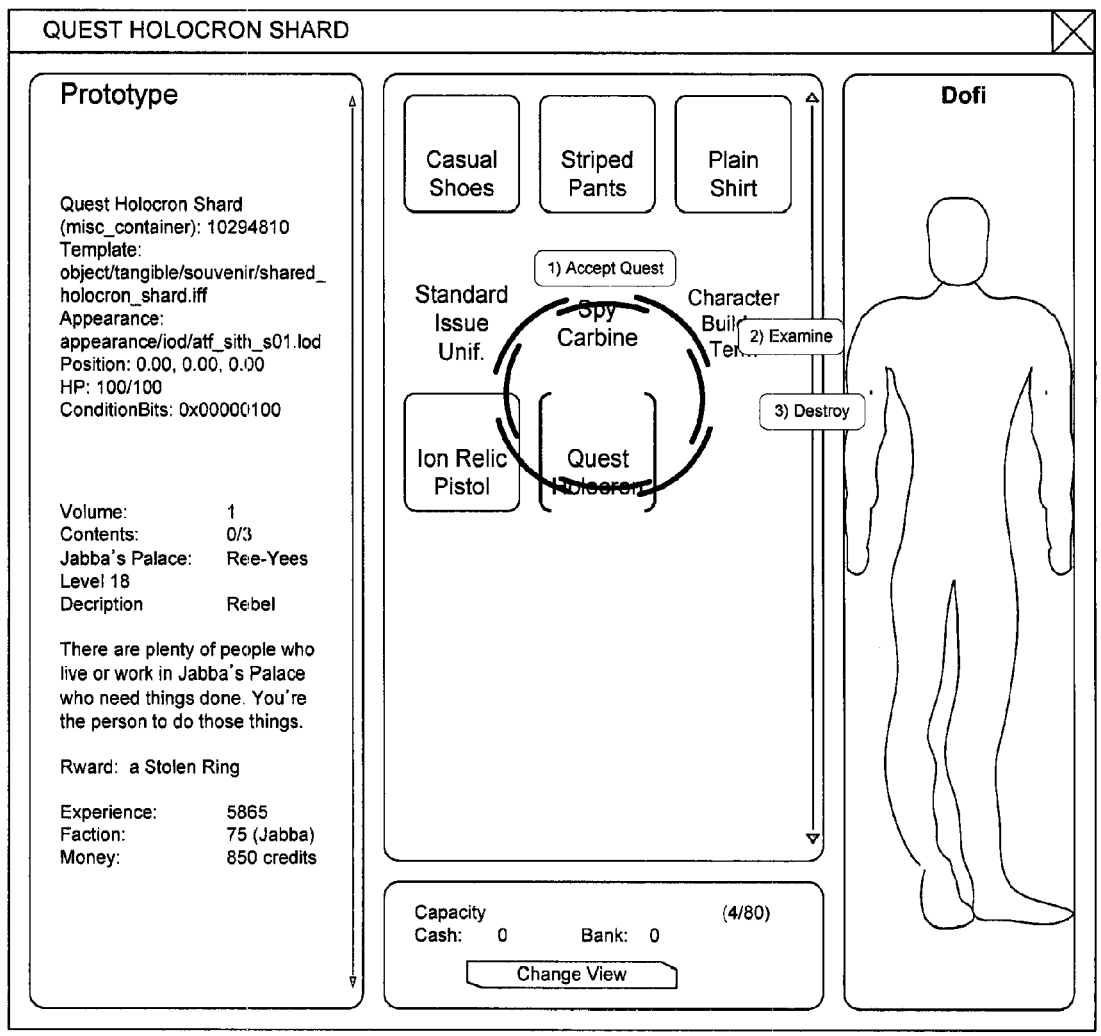
FIG. 4 is a Player Quest Granting user interface (UI) in accordance with one implementation of the present invention.

FIG. 4 is a Player Quest Granting UI 400 in accordance with one implementation of the present invention. In the illustrated implementation of FIG. 4, the holocron is stamped with "objvars" upon imprinting a holocron quest shard with a player-crafted quest. In this implementation, the objvars dictate what tasks and how many are used in the quest. The objvars reference entries in the various souvenir tables, as well as the player's custom text. The objvars on the holocron, for each task, include Task number, Task type, Task Description, and Quest Creator. Thus, the holocron should have a script on it that allows any player to consume it and gain the quest. Moreover, the holocron needs to be a container to hold any rewards. Further, the holocron should be able to examine the shard to get quest details such as Level, Tags, and Rewards.

Upon consumption, the shard uses a variant of the mission system to grant, to the player consuming the shard, the crafted quest. At this point, a new mission object is created in the player's data pad. The mission object has all the necessary objvars to reference the tasks in the quest. The shard should also be a container that holds tangible rewards.

As players progress through the quest, all of the necessary scripts are attached and detached to them. Upon completing the quest, the mission object is emptied (to give rewards) and destroyed. The player is then prompted to rate the quest. The rating increases the XP for the storyteller.

Figure 5:
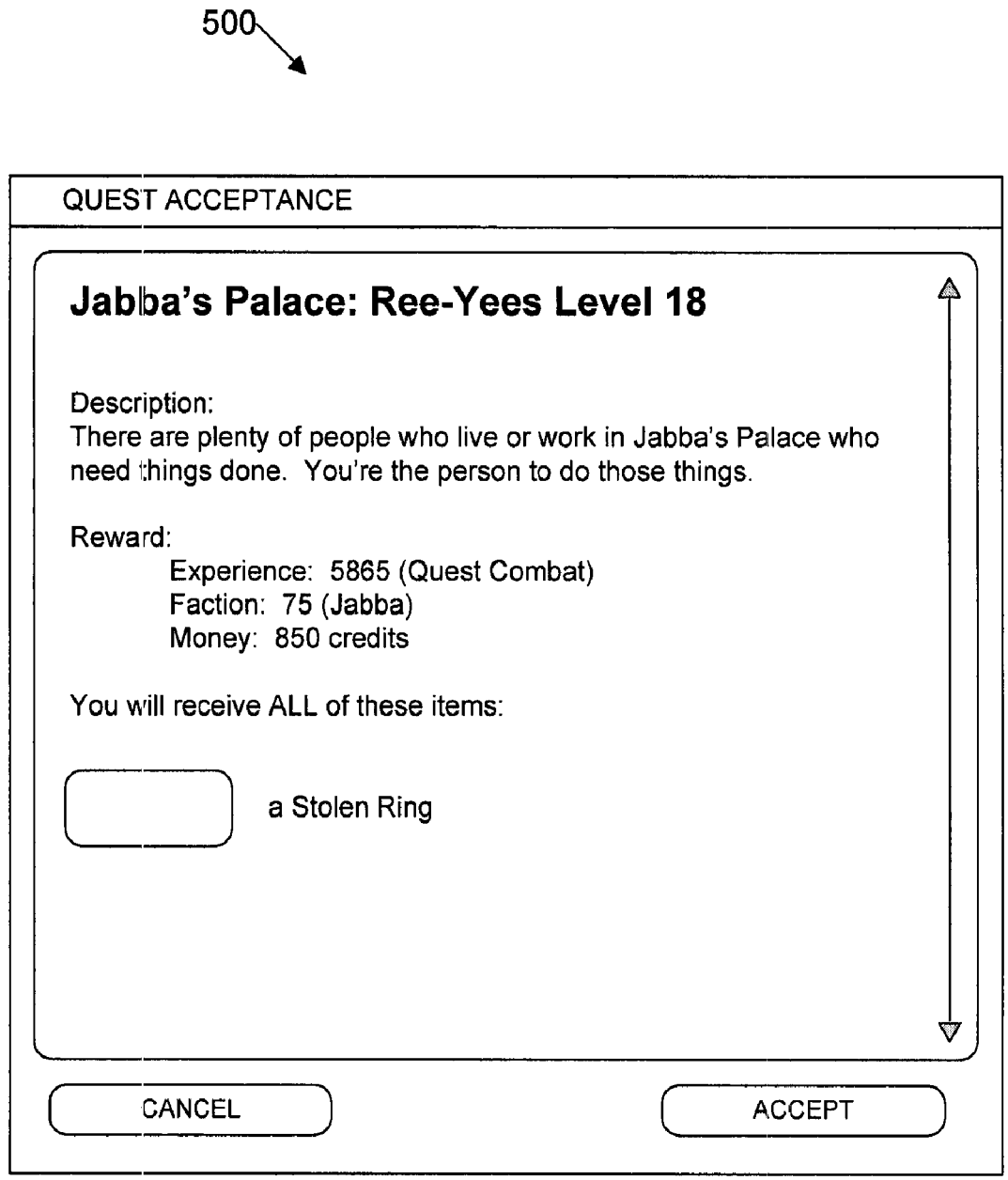
FIG. 5 is a pop up window to verify a request for activating the quest.
Figure 6:
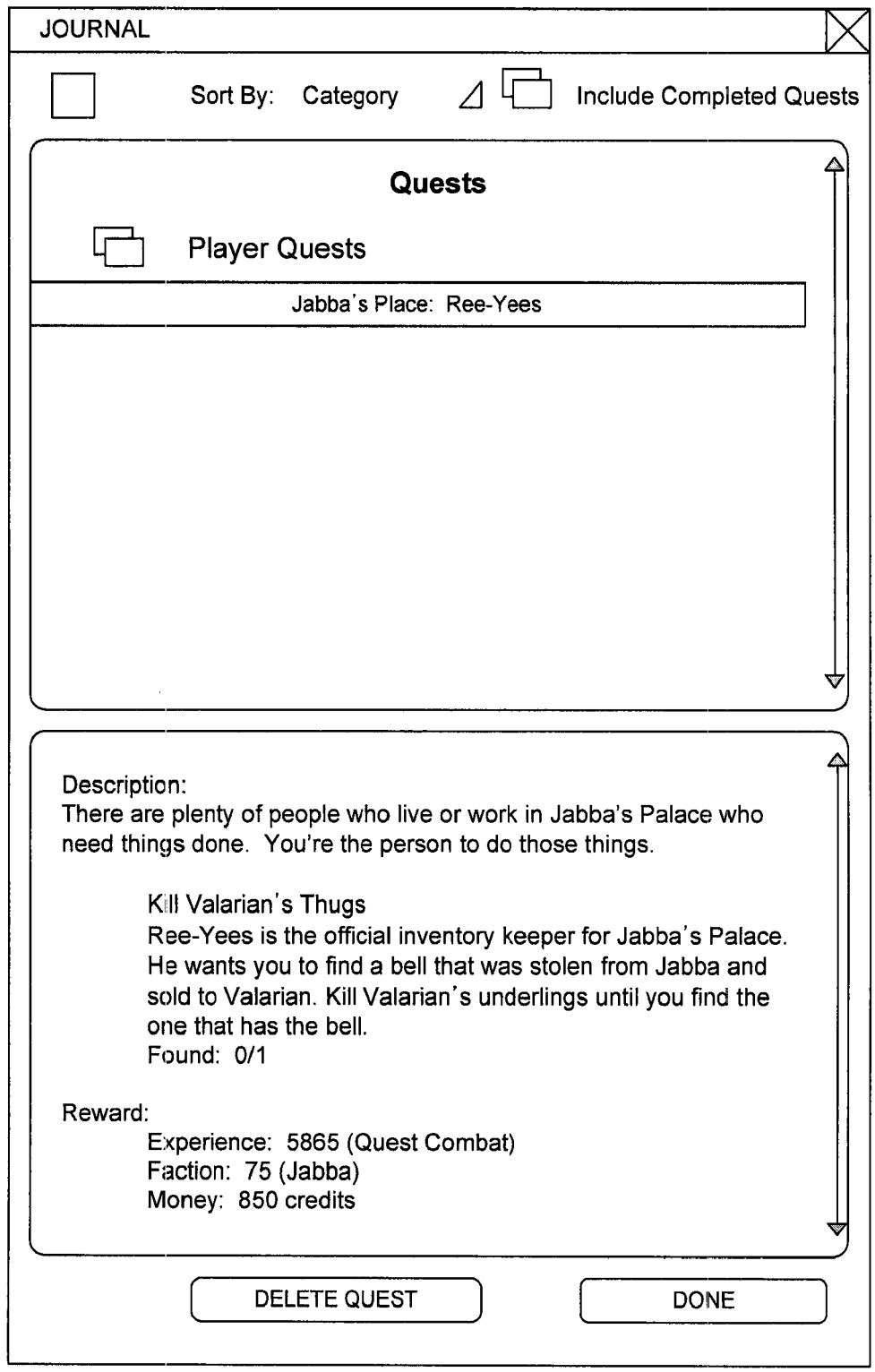
FIG. 6 is a Quest Journal window that tracks a player's progress.
Figure 7:
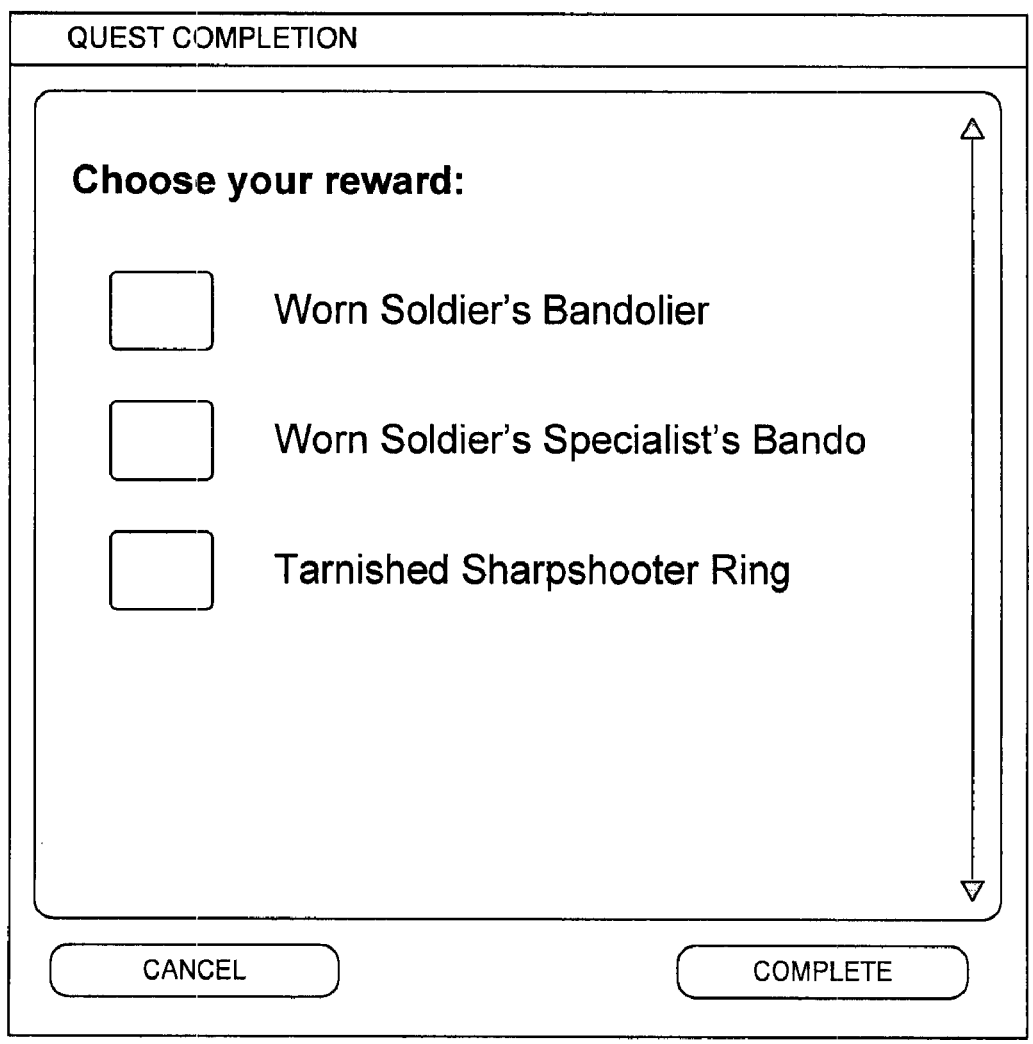
FIG. 7 is a UI with a list of potential rewards.

To activate the quest, a player taking the quest must buy the holocron, and use the radial menu on it. The player then receives a pop up window 500 (e.g., see FIG. 5) to verify the request for activating the quest. After the player accepts the quest, a Quest Journal window 600 (e.g., see FIG. 6) tracks the player's progress. The player receives all items and a rating UI 100 (e.g., see FIG. 1) upon completing the quest. Some quests reward "choice tokens," which are reward tokens a player can acquire through various means in a game. These tokens are placed into the player's inventory. When double clicked, the player gets a UI 700 (e.g., see FIG. 7) with a list of potential rewards. The player is able to choose one of these items, where each item is a reference to static items.

Figure 8:
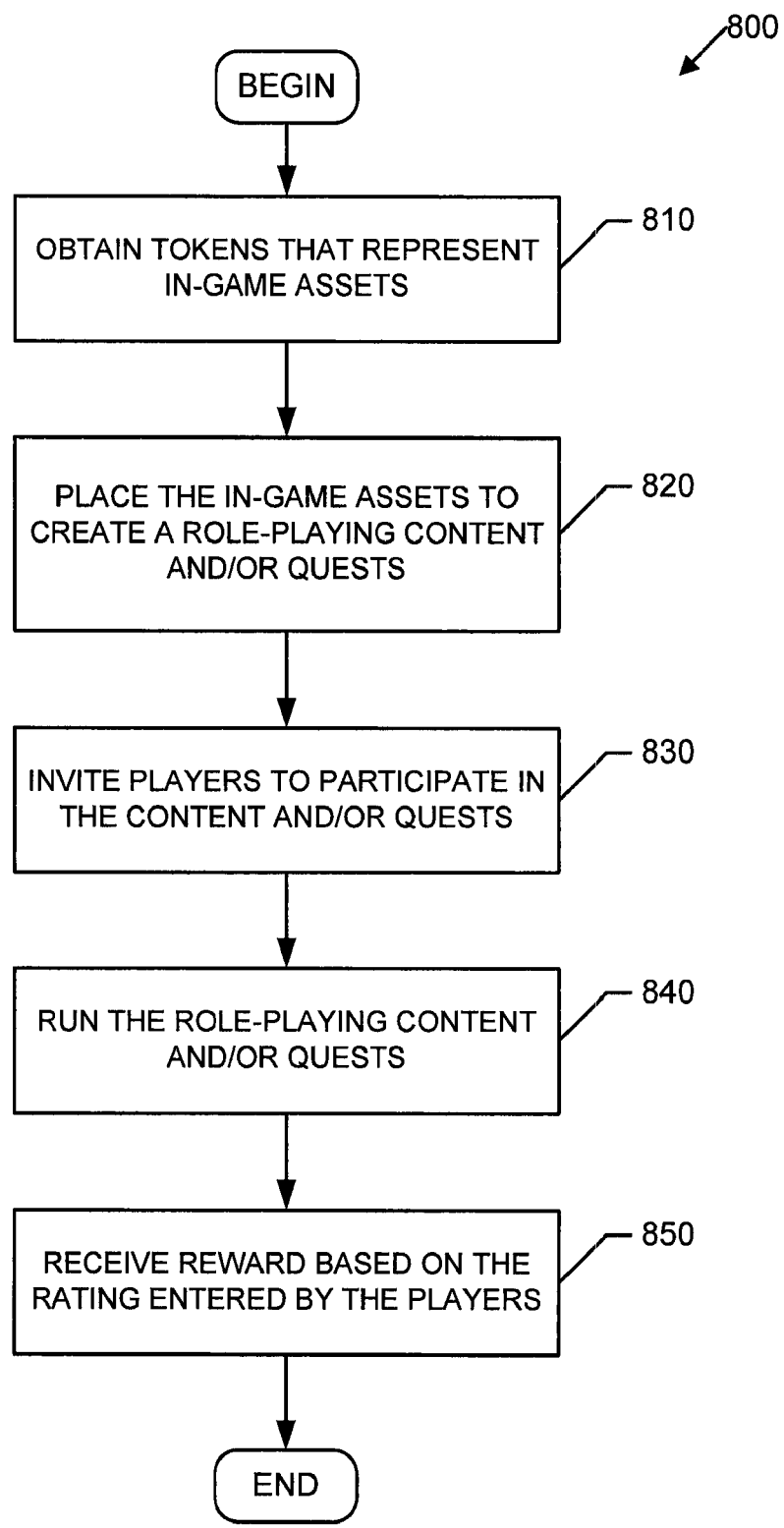
FIG. 8 is a flowchart implementing a computer game that allows players to create role-playing content and quests.

FIG. 8 is a flowchart 800 implementing a computer game that provides an environment for players to create role-playing content and/or quests. The computer game includes obtaining tokens that represent in-game assets, at box 810. In one implementation, the in-game assets include creatures, buildings, weapons, effects and sounds. The players can obtain, collect, or earn tokens in the MMO world that is populated with a large number of trigger tokens as treasures or rewards. Further, an in-game UI allows players to assemble these tokens into a set of steps and attach an item, cash or experience as a reward. The players can also enter free-form text to fictionalize the content and/or quests. The tokens are then placed in the shared world, at box 820, to create a role-playing content and/or quests. The role-playing content is sometimes referred to as "storytelling". Other players are invited, at box 830, to participate in the role-playing content and/or quests. At box 840, the storyteller or quest builder is allowed to run the role-playing content and/or quests. The storyteller or quest builder then receives at least one reward, at box 850, based on the rating entered by the other players. The storyteller or quest builder can also save the layout and composition of these creations (content and/or quests) to a blueprint which can be traded with other players.

Figure 9A:
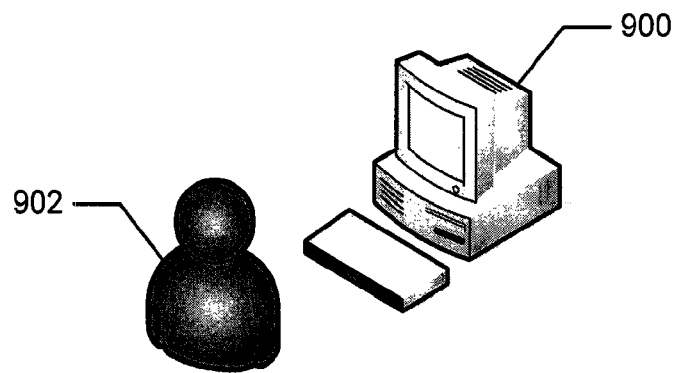
FIG. 9A illustrates a representation of a computer system and a user.

FIG. 9A illustrates a representation of a computer system 900 and a user 902. The user 902 uses the computer system 900 to create role-playing content and/or quests. The computer system 900 stores and executes a content/quest builder 990.

Figure 9B:
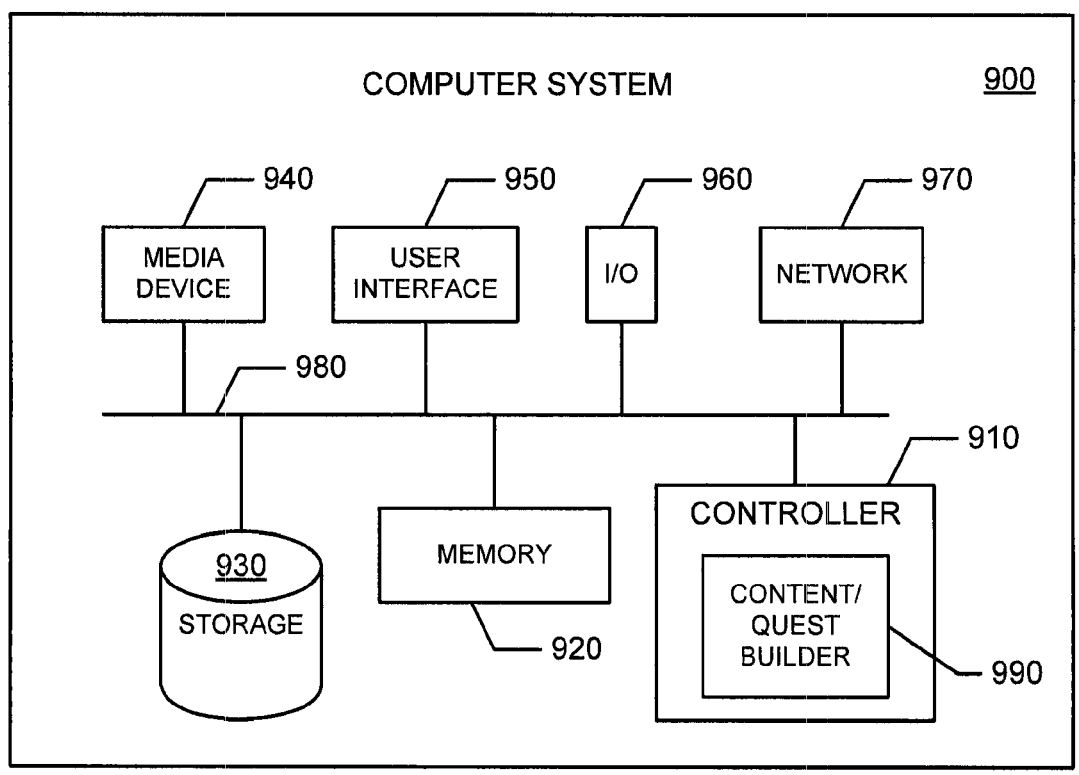
FIG. 9B is a functional block diagram illustrating the computer system hosting the content/quest builder.

FIG. 9B is a functional block diagram illustrating the computer system 900 hosting the content/quest builder 990. The controller 910 is a programmable processor and controls the operation of the computer system 900 and its components. The controller 910 loads instructions (e.g., in the form of a computer program) from the memory 920 or an embedded controller memory (not shown) and executes these instructions to control the system. In its execution, the controller 910 provides the content/quest builder 990 as a software system. Alternatively, this service can be implemented as separate hardware components in the controller 910 or the computer system 900.

Memory 920 stores data temporarily for use by the other components of the computer system 900. In one implementation, memory 920 is implemented as RAM. In one implementation, memory 920 also includes long-term or permanent memory, such as flash memory and/or ROM.

Storage 930 stores data temporarily or long term for use by other components of the computer system 900, such as for storing data used by the content/quest builder 990. In one implementation, storage 930 is a hard disk drive.

The media device 940 receives removable media and reads and/or writes data to the inserted media. In one implementation, for example, the media device 940 is an optical disc drive.

The user interface 950 includes components for accepting user input from the user of the computer system 900 and presenting information to the user. In one implementation, the user interface 950 includes a keyboard, a mouse, audio speakers, and a display. The controller 910 uses input from the user to adjust the operation of the computer system 900.

The I/O interface 960 includes one or more I/O ports to connect to corresponding I/O devices, such as external storage or supplemental devices (e.g., a printer or a PDA). In one implementation, the ports of the I/O interface 960 include ports such as: USB ports, PCMCIA ports, serial ports, and/or parallel ports. In another implementation, the I/O interface 960 includes a wireless interface for communication with external devices wirelessly.

The network interface 970 includes a wired and/or wireless network connection, such as an RJ-45 or "Wi-Fi" interface (including, but not limited to 802.11) supporting an Ethernet connection.

The computer system 900 includes additional hardware and software typical of computer systems (e.g., power, cooling, operating system), though these components are not specifically shown in FIG. 9B for simplicity. In other implementations, different configurations of the computer system can be used (e.g., different bus or storage configurations or a multi-processor configuration).

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

TABLE 1

| Tier | Quests Allowed | Tasks Allowed | Commands Granted | Items Granted | Give Title |
|---|---|---|---|---|---|
| 1 | 3 | 3 | | | True |
| 2 | | 1 | | booster | |
| 3 | 1 | | vendor 1 | | |
| 4 | | 1 | | | |
| 5 | 1 | | link_tasks | | |
| 6 | | 1 | | tier_1 robes | True |
| 7 | 1 | | vendor 2 | booster | |
| 8 | | 1 | | | |
| 9 | 2 | 2 | | furniture | |
| 10 | 1 | | | | |
| 11 | | 1 | vendor 3 | | |
| 12 | 1 | | | tier_2 robes | True |
| 13 | | 1 | | booster | |
| 14 | 1 | | | | |
| 15 | 1 | 1 | | house_sign | |
| 16 | 1 | | | | |
| 17 | 1 | | | booster | |
| 18 | 1 | | | Legendary_robes, action_figures | True |

TABLE 2

| Tier | Total per Day (at 20 quests a day) | Amount to next Tier |
|---|---|---|
| 1 | 15000 | 30000 |
| 2 | 20000 | 70000 |
| 3 | 20000 | 110000 |
| 4 | 25000 | 160000 |
| 5 | 25000 | 210000 |
| 6 | 30000 | 270000 |
| 7 | 30000 | 330000 |
| 8 | 35000 | 400000 |
| 9 | 45000 | 490000 |
| 10 | 45000 | 580000 |
| 11 | 50000 | 680000 |
| 12 | 50000 | 780000 |
| 13 | 55000 | 890000 |
| 14 | 55000 | 1000000 |
| 15 | 60000 | 1120000 |
| 16 | 60000 | 1240000 |
| 17 | 60000 | 1360000 |
| 18 | 60000 | 1480000 |

What is claimed is:

1. A computer-implemented method of providing an environment for a crafting player to craft a role-playing content and/or quests in a computer game, the method comprising:
    obtaining tokens that represent in-game assets;
    placing the tokens to craft the role-playing content and/or quests;
    inviting other players to participate in the role-playing content and/or quests;
    running the role-playing content and/or quests;
    receiving at least one reward, including tokens, experience points (XP), in-game treasures, and other in-game items, based on a rating entered by the other players; and
    saving a layout and composition of the crafted role-playing content and/or quests in a blueprint.

2. The method of claim 1, wherein the in-game assets include creatures, buildings, weapons, effects and sounds.

3. The method of claim 1, wherein the crafting player obtains, collects, or earns tokens in the computer game populated with a large number of trigger tokens as treasures or rewards.

4. The method of claim 1, wherein placing the tokens to craft a role-playing content and/or quests includes
    providing a user interface to allow the crafting player to enter free-form text to fictionalize the role-playing content and/or quests.

5. The method of claim 1, wherein the role-playing content and/or quests are crafted by making at least one of video and comic using a computer game engine.

6. The method of claim 1, wherein the role-playing content and/or quests include points of interest and locations.

7. The method of claim 1, wherein the role-playing content and/or quests include attackable non-player characters.

8. The method of claim 1, wherein the crafting player progresses in the computer game by skill tiers, and
    wherein the crafting player gains experience by having the other players complete the crafted content and/or quests.

9. The method of claim 8, wherein the experience gained from the other players completing the crafted content and/or quests is calculated based on the complexity of the content and/or quests.

10. The method of claim 1, wherein the crafting player is considered as a novice when the player first logs into the computer game, and is provided with a starter kit.

11. The method of claim 10, wherein the starter kit has a number of specific task types.

12. The method of claim 10, wherein the crafting player who is a novice receives an experience point just for crafting the role-playing content and/or quests.

13. The method of claim 12, wherein the rating entered by the other players is used as a modifier on the experience point received by the crafting player,
wherein the modifier is a formula that adds a percentage to the experience point reward based on the rating.

14. The method of claim 1, further comprising
generating vendors for selling the crafted role-playing content and/or quests in holocrons.

15. The method of claim 1, wherein tokens include souvenirs, and each souvenir has an experience value assigned to it.

16. The method of claim 15, wherein once the souvenir is used in a crafted quest, the experience value assigned to the souvenir is equal to an experience value gained by a player finishing the crafted quest.

17. The method of claim 15, further comprising
trading extra souvenirs for items that the crafting player can use as rewards in the quests.

18. The method of claim 15, further comprising
trading in a number of certain types of souvenirs to get an upgraded version of the souvenirs.

19. A non-transitory tangible medium storing a computer program for crafting a role-playing content and/or quests, the program comprising executable instructions that cause a computer to:
obtain tokens that represent in-game assets;
place the tokens to craft the role-playing content and/or quests;
invite other players to participate in the role-playing content and/or quests;
run the role-playing content and/or quests;
receive at least one reward, including tokens, experience points (XP), in-game treasures, and other in-game items, based on the rating entered by the other players; and
save a layout and composition of the crafted role-playing content and/or quests in a blueprint.

20. The non-transitory tangible medium of claim 19, wherein executable instructions that cause a computer to place the tokens to craft a role-playing content and/or quests includes executable instructions that cause a computer to
provide a user interface to allow the crafting player to enter free-form text to fictionalize the role-playing content and/or quests.

21. The non-transitory tangible medium of claim 19, wherein the role-playing content and/or quests include attackable non-player characters.

22. The non-transitory tangible medium of claim 19, further comprising executable instructions that cause a computer to
generate vendors for selling the crafted role-playing content and/or quests in holocrons.

23. A computer-implemented method of crafting quests in a computer game, the method comprising:
displaying a list of souvenir task tokens, each souvenir task token used to define a task;
loading a number of task tokens selected from the list into a blank quest;
providing text blocks to allow a crafting player to input a flavor text for the task defined for each souvenir task token;
granting experience points to the crafting player based on tasks that are put into the quest; and
saving a layout and composition of the crafted quests in a blueprint.

* * * * *